United States Patent
McKinzy, Sr.

(10) Patent No.: US 11,488,272 B1
(45) Date of Patent: *Nov. 1, 2022

(54) ELECTRONIC VOTING IDENTITY AUTHENTICATION SYSTEM AND METHOD

(71) Applicant: Michael E. McKinzy, Sr., Trustee of the Michael McKinzy Trust dated April 16, 2018, Overland Park, KS (US)

(72) Inventor: Michael Eugene McKinzy, Sr., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,256

(22) Filed: Jan. 19, 2022

Related U.S. Application Data

(63) Continuation-in-part of application No. 17/343,586, filed on Jun. 9, 2021, now Pat. No. 11,263,853.

(60) Provisional application No. 63/157,846, filed on Mar. 8, 2021.

(51) Int. Cl.
*G07C 13/00* (2006.01)
*G06Q 50/26* (2012.01)
*G06F 21/32* (2013.01)

(52) U.S. Cl.
CPC ........... *G06Q 50/265* (2013.01); *G06F 21/32* (2013.01); *G07C 13/00* (2013.01)

(58) Field of Classification Search
CPC .. G06Q 50/265; G06Q 2230/00; G06F 21/32; G07C 13/00
USPC ....................................................... 235/386
See application file for complete search history.

(56) References Cited

U.S. PATENT DOCUMENTS

| | | | |
|---|---|---|---|
| 7,161,465 B2 | 1/2007 | Wood et al. | |
| 9,430,629 B1 | 8/2016 | Ziraknejad et al. | |
| 10,867,149 B2 | 12/2020 | Holz | |
| 2004/0024694 A1 | 2/2004 | Lawrence et al. | |
| 2014/0125502 A1 | 5/2014 | Wittkop et al. | |
| 2016/0140331 A1 | 5/2016 | Perez | |
| 2017/0372541 A1 | 12/2017 | Attar | |
| 2020/0005272 A1 | 1/2020 | Iqbal et al. | |

FOREIGN PATENT DOCUMENTS

| | | |
|---|---|---|
| DE | 102014011806 A1 | 2/2016 |
| JP | 2008009753 A | 1/2008 |
| JP | 5402137 B2 | 1/2014 |
| JP | 2017049867 A | 3/2017 |
| WO | 2010096684 A2 | 8/2010 |
| WO | 2017178816 A1 | 10/2017 |

*Primary Examiner* — Jamara A Franklin
(74) *Attorney, Agent, or Firm* — John Rizvi; John Rizvi, P.A. The Patent Professor

(57) ABSTRACT

An electronic voting identity authentication system and method employing a voting kiosk is provided for facilitating electronic voting using a three-part voter identity authentication thereby enhancing voter identity authentication and the reduction of voter fraud. The voting kiosk employs a palm vein scanner and a QR code reader that employ a user profile comprising at least a DNA sample, a set of genealogical information and a palm vein scan that are specific to a particular registered voter. Upon arriving at a polling site to vote, the registered voter employs the voting kiosk to capture a palm vein scan that is employed to authenticate the identity, of the voter.

20 Claims, 10 Drawing Sheets

ELECTRONIC VOTING IDENTITY AUTHENTICATION SYSTEM AND METHOD

CROSS REFERENCE TO RELATED APPLICATION

This application is a continuation-in-part of co-pending U.S. patent application Ser. No. 17/343,586 filed Jun. 9, 2021, which claims the benefit of U.S. Provisional Application 63/157,846, filed Mar. 8, 2021, each of which is incorporated by reference herein in their entirety.

FIELD OF THE INVENTION

The present invention relates generally to electronic voting systems, and more particularly, to a system and method that facilitate electronic voting using a three-part voter identification authentication.

BACKGROUND OF THE INVENTION

The right to vote is a cornerstone of democracy. Government officials are concerned about the credibility of elections and want assurances that voting systems are designed to count every vote properly. Elections allow the populace to choose their representatives and express their preferences for how they will be governed. Naturally, the integrity of the election process is fundamental to the integrity of democracy itself. The election system must be sufficiently robust to withstand a variety of fraudulent behaviors and must be sufficiently transparent and comprehensible that voters and candidates can accept the results of an election. Unsurprisingly, history is littered with examples of elections being manipulated to influence their outcome. In the United States of America, the presidential elections of 2000 and 2020 highlighted, to the public, many problems associated with mechanical voting systems and associated voting issues such as claims of voting fraud. Unfortunately, in the annals of US election history, these elections will be remembered neither for any substantive policy nor historically significant political issues, rather for the now infamous controversy surrounding hanging chads and multiple recounts (in 2000) and claims of voter fraud (in 2020). In 2020, the election saw a record number of ballots cast early and by mail due to the ongoing COVID-19 pandemic. As a result of a large number of mail-in ballots, some so-called voter swing states saw delays in vote counting and reporting. This led to major news outlets delaying their projection and high-levels of vitriol between the respective presidential candidates and their respective political party. Another flaw in the current voting systems is the concern of people voting multiple times, of deceased voting (i.e., dead, or non-existent people voting) and/or unregistered/unqualified voters voting in an election. This is mainly a result of the local voting personnel using archaic methods for verifying the voter. Various techniques are used, but it is relatively easy to fake ID or possibly vote in multiple locations. Other issues such as absentee ballots, receipts verifying electronic votes, etc., confuse the issue even further. Consequently, confidence in the ability of the government to administer elections was substantially eroded.

Traditionally, voting systems in place around the world typically involve either paper ballots or mechanical counters. The paper ballots used in some areas may be as simple as a form onto which the selected candidate's name is written or on which an "X" is placed to indicate the candidate selected by the voter. Alternatively, the paper ballot may have holes punched therein adjacent to the desired candidate or ballot issue. With such ballots, the only time the voter is required to write on the ballot is if a write-in candidate is selected. There are many disadvantages to such paper ballot systems. One is the fact that paper ballots can become physically damaged, or altered, between the time the voter makes the selection and the time a ballot-counting machine eventually reads the voter's selection on the ballot. Another disadvantage is that voters can inadvertently punch the hole or place the "X" next to a different candidate than was intended by the voter. When this goes unnoticed by the voter, the voter ends up casting, a vote which was not intended. In addition, write-in votes must be manually read by an election official, which is time consuming and may be exceedingly difficult, depending upon the legibility of the voter's handwriting. In many cases, the name written in cannot be read and the vote does not count. Also, paper ballots must be custom printed for each election, with at least one ballot printed for each potential voter. Since these ballots are specific to a particular election, the costs are significant for each election.

Legislatures and other government officials are scrambling to find affordable replacements for outmoded, and costly voting systems such as controversial punch-card voting machines, costly optical reader systems, and other voting methods currently in use. Many states took notice of the problems associated with mechanical voting systems and responded by examining and, in some instances, installing new types of units, including electronic voting machines. However, there are problems associated with the adoption and use of electronic voting machines. One such problem concerns the significant monetary investment. Since most jurisdictions use mechanical voting systems, the adoption of electronic voting machines requires the purchase of all new equipment. Economic efficiency militates against this solution. However, as the opportunity to use improved technology expands the range of choices, new solutions become feasible.

The design of a "good" voting system, whether electronic or using traditional paper ballots or mechanical devices, must satisfy several sometimes, competing criteria. The anonymity of a voter's ballot must be preserved, both to guarantee the voter's safety when voting against a malevolent candidate, and to guarantee that voters have no evidence that proves which candidates received their votes. The existence of such evidence would allow votes to be purchased by a candidate, for example. The voting system must also be tamper-resistant to thwart a wide range of attacks, including ballot stuffing by voters and incorrect tallying by insiders.

In addition to the significant costs associated with replacing mechanical voting systems and with the purchasing of electronic voting systems, concerns have been raised about the trustworthiness of electronic voting systems. A primary question raised is whether the electronic voting systems, or their suppliers, can be trusted to provide the technology needed to accurately record each voter's vote. Commercial interests, partisan politics and conflicts of interest exist and persist to cloud these issues. Public confidence is an essential element and remains sorely lacking today, hence the need for improvements and better systems. The number of these negative reports coupled with the lack of "openness" of the technology (i.e., most, if not all, electronic voting systems use proprietary technology, which is not open to public examination), has led to a mistrust of available electronic voting technology, and the specific electronic voting machines used. No sufficient degree of improvements has been forthcoming, leading to the conclusion that long-standing needs remain to be addressed.

Accordingly, there is need for an improved electronic voting system that enhances voter identity authentication and the reduction of voter fraud, and/or identity fraud associated with the use of and access to any third-party applications.

SUMMARY OF THE INVENTION

The present invention is directed to a system and method that facilitates electronic voting using a three-part voter identity authentication thereby enhancing voter identity authentication and the reduction of voter fraud, and/or identity fraud associated with the use of and access to any third-party applications.

In a first implementation of the invention, a voting kiosk is provided for facilitating electronic voting using a three-part voter identity authentication thereby enhancing voter identity authentication and the reduction of voter fraud. The voting kiosk comprising at least: a processor, a palm vein scanner, a QR code reader, a display device, a graphical interface generator, a database manager, a communications interface and a memory storing instructions that when executed cause the processor to execute operations comprising: (i) receiving, from the palm vein scanner, a palm vein scan of a voter; (ii) determining whether the voter is a registered voter; (iii) if registered, retrieving a respective user profile for the registered voter from a plurality of user profiles for the registered user, the respective user profile comprising at least a DNA sample, a set of genealogical information and a palm vein scan; (iv) authenticating, using the palm vein scan received and the respective user profile retrieved, the identity of the registered voter; (v) if the registered voter's identity is authenticated, receiving from the registered voter, using the QR code reader, a voter election code; (vi) determining whether the voter election code received is valid; (vii) if valid, authorizing voting for the registered voter; (viii) receiving and transmitting the registered voter's official ballot submission; (ix) issuing a voter participation receipt to the registered voter and transmitting a voter participation electronic notification; and (x) setting and transmitting a voter participation exclusion for the current election cycle specific to the registered voter.

In a second aspect, a method is provided for facilitating electronic voting using a three-part voter identity authentication thereby enhancing voter identity authentication and the reduction of voter fraud, the method comprising operations of: (i) receiving, from a user, a DNA sample, a set of genealogical information and a palm vein scan; (ii) creating a user profile, the user profile comprising at least the DNA sample, the set of genealogical information and the palm vein scan received; (iii) storing, in a database, the user profile created (iv) receiving, from a palm vein scanner, a palm vein scan of a voter; (v) determining whether the voter is a registered voter; (vi) if registered, retrieving a respective user profile for the registered voter from a plurality of user profiles for the registered user, the respective user profile comprising at least a DNA sample, a set of genealogical information and a palm vein scan; (vii) authenticating, using the palm vein scan received and the respective user profile retrieved, the identity of the registered voter; (viii) if the registered voter's identity is authenticated, receiving from the registered voter, using a QR code reader, a voter election code; (ix) determining whether the voter election code received is valid; (x) if valid, authorizing voting for the registered voter; (xi) receiving and transmitting the registered voter's official ballot submission; (xii) issuing a voter participation receipt to the registered voter and transmitting a voter participation electronic notification; and (xiii) setting and transmitting a voter participation exclusion for the current election cycle specific to the registered voter.

In a third aspect, an EVote technology voting kiosk application (alternatively referred to herein as an "app") is provided for executing, on the voting kiosk or other hardware, operations comprising: (i) receiving, from a user, a DNA sample, a set of genealogical information and a palm vein scan; (ii) creating a user profile, the user profile comprising at least the DNA sample, the set of genealogical information and the palm vein scan received; (iii) storing, in a database, the user profile created (iv) receiving, from a palm vein scanner, a palm vein scan of a voter; (v) determining whether the voter is a registered voter; (vi) if registered, retrieving a respective user profile for the registered voter from a plurality of user profiles for the registered user, the respective user profile comprising at least a DNA sample, a set of genealogical information and a palm vein scan; (vii) authenticating, using the palm vein scan received and the respective user profile retrieved, the identity of the registered voter; (viii) if the registered voter's identity is authenticated, receiving from the registered voter, using a QR code reader, a voter election code; (ix) determining whether the voter election code received is valid; (x) if valid, authorizing voting for the registered voter; (xi) receiving and transmitting the registered voter's official ballot submission; (xii) issuing a voter participation receipt to the registered voter and transmitting a voter participation electronic notification; and (xiii) setting and transmitting a voter participation exclusion for the current election cycle specific to the registered voter.

In a fourth aspect, the EVote technology voting kiosk app may be a mobile application executing on a mobile device and wherein the mobile device may be a smartphone, laptop computer, tablet and/or wearable device.

In a fifth aspect, the registered voter's official ballot submission is captured using a distributed ledger technology (DLT) protocol.

In a sixth aspect, the distributed ledger is a blockchain.

In a seventh aspect, a method is provided for identity fraud detection with respect to the use of and access to any third-party application using the aforementioned three-part voter identity authentication, the method comprising operations of: (i) receiving, from a user, a DNA sample, a set of genealogical information and a palm vein scan; (ii) creating a user profile, the user profile comprising at least the DNA sample, the set of genealogical information and the palm vein scan received; (iii) storing, in a database, the user profile created (iv) receiving, from a palm vein scanner, a palm vein scan of a voter; (v) determining whether the voter is a registered voter; (vi) if registered, retrieving a respective user profile for the registered voter from a plurality of user profiles for the registered user, the respective user profile comprising at least a DNA sample, a set of genealogical information and a palm vein scan; (vii) authenticating, using the palm vein scan received and the respective user profile retrieved, the identity of the registered voter; (viii) if the registered voter's identity is authenticated, receiving from the registered voter, using a QR code reader, a voter election code; (ix) determining whether the voter election code received is valid; (x) if valid, authorizing access to the third-party application upon a request from the registered voter for access thereto, and enabling the registered voter's access to the third-party application; (xi) issuing a third-party application participation receipt to the registered voter;

and (xii) transmitting a third-party application participation electronic notification. In this way, by applying the three-part voter identity authentication technique fraud detection and user identity protection can be facilitated and delivered to the access and use of any type of third-party application in which there is a need for robust identity authentication to reduce fraud.

In a further aspect, such third-party applications include, but are not limited to, a verification of individual participation (VIP), an international transportation and travel services (ITAS), an employment eligibility U.S. Citizenship and Immigration Services (USCIS), Form I-9 services (I-Verify), an electronic verification of transactions (EVT), a school attendance verification and eats (SAVE), a family united network (FUN), a children abduction recovery education system (CARES), a food assistance programs (FAP), a census counting protocol (CCP), and a vaccination and authentication status system (VASS).

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward directed to a system and method that provides for the identity authentication to increase security and reduce fraud. In particular, electronic voting, via a specifically configured voting kiosk, using a three-part voter identity authentication thereby enhancing voter identity authentication and the reduction of voter fraud. Importantly, the EVote technology voting kiosk and methodology of the disclosed embodiments provides an advantageous improvement of at least two practical applications, i.e., electronic voting and/or identity authentication. This solves an electronic voting security problem and reduces the possibility of voter fraud. Importantly, in accordance with the principles of the disclosed embodiments, the identity authentication, carried out by and through the EVote technology voting kiosk here under, employs a specific three-part authentication comprising a DNA sample, a set of genealogical information, and palm vein scan that are each specific to a particular individual (e.g., a registered voter) thereby improving the capability of identity authentication is such systems and applications.

Figure 1:
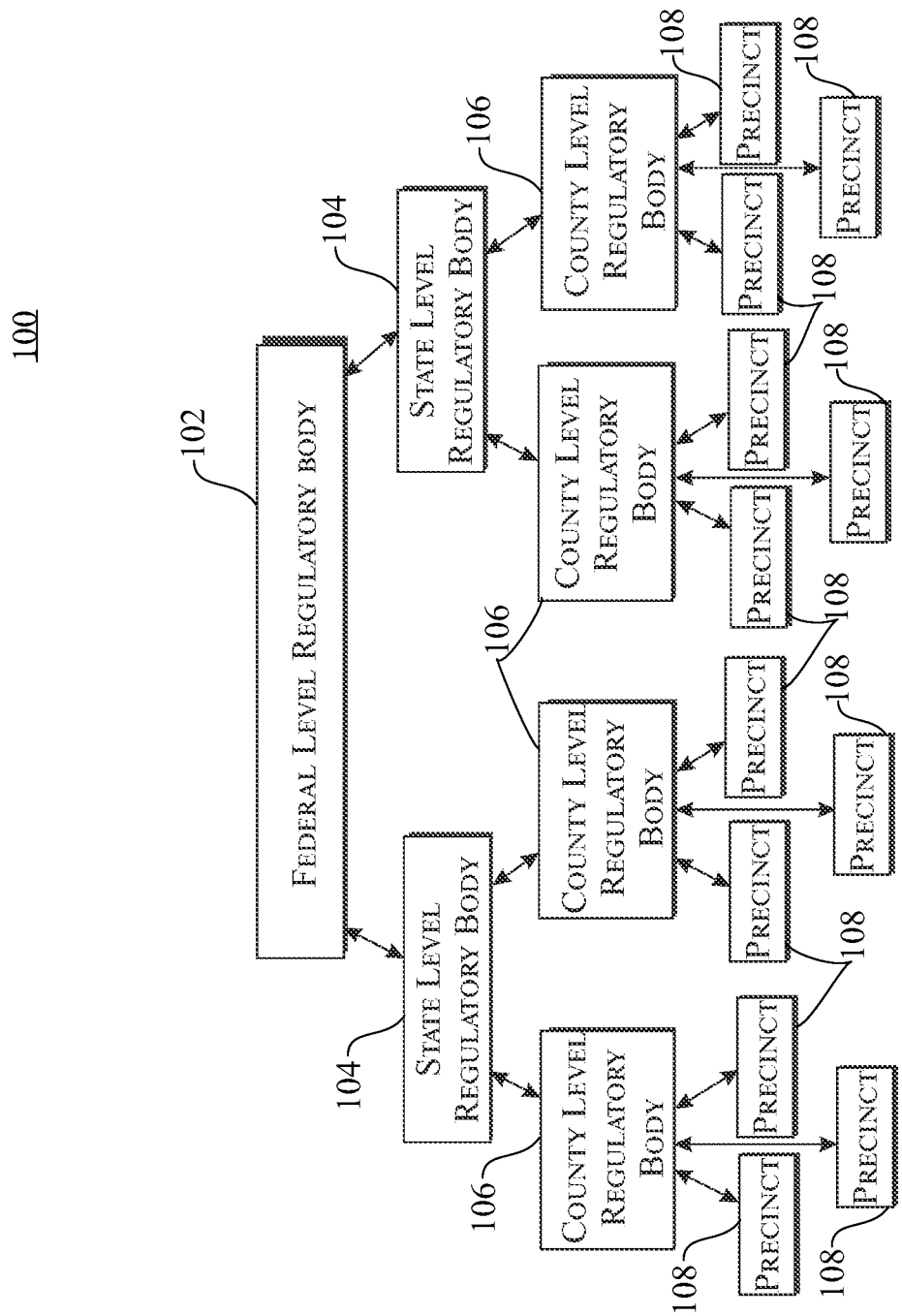
FIG. 1 presents a high-level block diagram of a United States of America election hierarchy in accordance with an embodiment.

FIG. 1 presents a high-level block diagram of a United States of America election hierarchy 100 in accordance with an embodiment. As shown, the exemplary election hierarchy 100 consists of four (4) levels of election regulatory bodies. The highest level of election regulatory bodies is federal level election regulatory body 102 a national or countrywide level that receives election reports from state level election regulatory bodies 104. State level regulatory bodies 104 consolidate election results from election levels required to report to it and can transfer results to federal election regulatory body 102, as required. County level regulatory bodies 106 represents elections of any jurisdiction one level above precinct level (e.g., county, city, parish, district, borough, or regional level. For county-only elections, this is the highest level of tabulation required. For state-wide-elections, each county level regulatory bodies 106 consolidates precinct data and transfers results to next highest reporting level. In most cases, for state-wide elections this is the highest level of tabulation required, but in some cases the county level regulatory bodies 106 provides election reports to the federal level regulatory body 102. Precinct 108 is the fourth level and serving as a specified voting location for an election, and the precinct(s) 108 reports to the next higher election level, typically the county election regulatory bodies 106. Accumulated voter data from each of the precinct(s) 108 are transferred from precinct 108 to county level regulatory bodies 106. Election results from all the precinct bodies 108 are gathered and consolidated by the county level regulatory bodies 106. When elections require additional levels of reporting, the pattern of data consolidation and transfer to next highest election regulatory body level continues until highest level of reporting is reached and a final election result is determined. In an embodiment, county level election regulatory bodies 106, state level election regulatory bodies 104, and federal level regulatory body 102 follow identical procedures and systems and use the same configurations. Of course, while the detailed description herein will focus on elections/voting it will be understood that principles of the disclosed embodiment will apply equally to any application in which there is a need for robust identity authentication to reduce fraud. For example, credit card identity theft applications, banking applications, medical applications, to name just a few will benefit from the improvements demonstrated by the disclosed embodiments herein.

Figure 2:
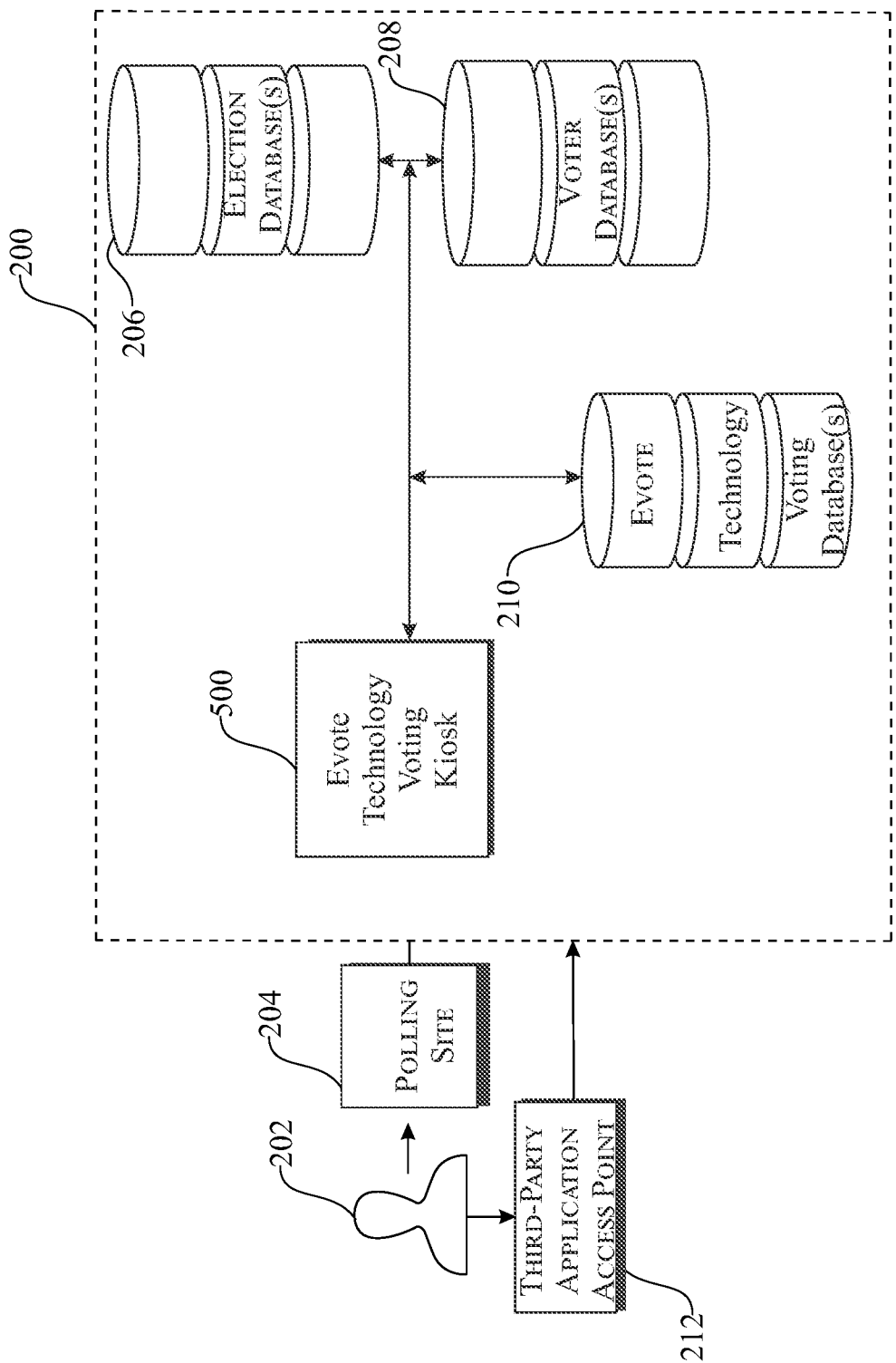
FIG. 2 presents a high-level block diagram of an electronic voting system in accordance with an embodiment.

Turning our attention to FIG. 2, a high-level block diagram of an electronic voting system 200 is shown in accordance with an embodiment. As depicted, a voter 202 arrives at and interacts with a polling site 204 looking to participate in a particular election and cast their individual vote(s). The polling site 204 is communicatively coupled to the electronic voting system 200 via a cloud-based network architecture (e.g., cloud-based network architecture 800 in FIG. 8, as will be further discussed herein below). As such, the polling site 204 will have at least one voting kiosk 500 (see, FIG. 5) resident at the site and serving as (or at) the polling booth to administer and collect the votes. Such administration and collection are facilitated by EVote Technology voting database(s) 210, election database(s) 206, and voter database(s) 208. Illustratively, the EVote Technology voting database(s) 210, the election database(s) 206, the voter database(s) 208 are maintained by an election board (e.g., state level regulatory body 104).

Figure 3:
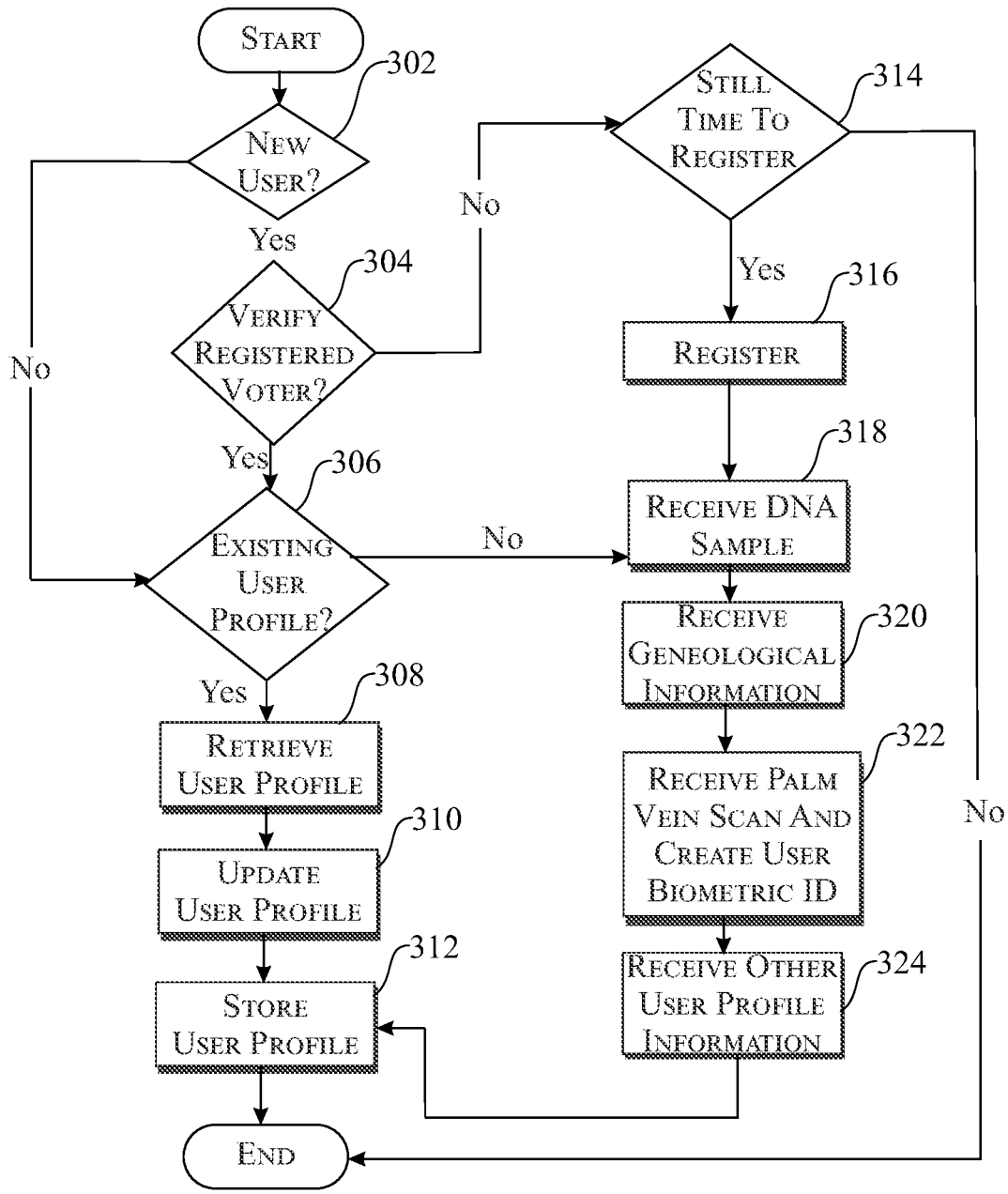
FIGS. 3 and 4 present flowcharts of illustrative operations for facilitating electronic voting using a three-part voter identity authentication in accordance with an embodiment.
Figure 4:
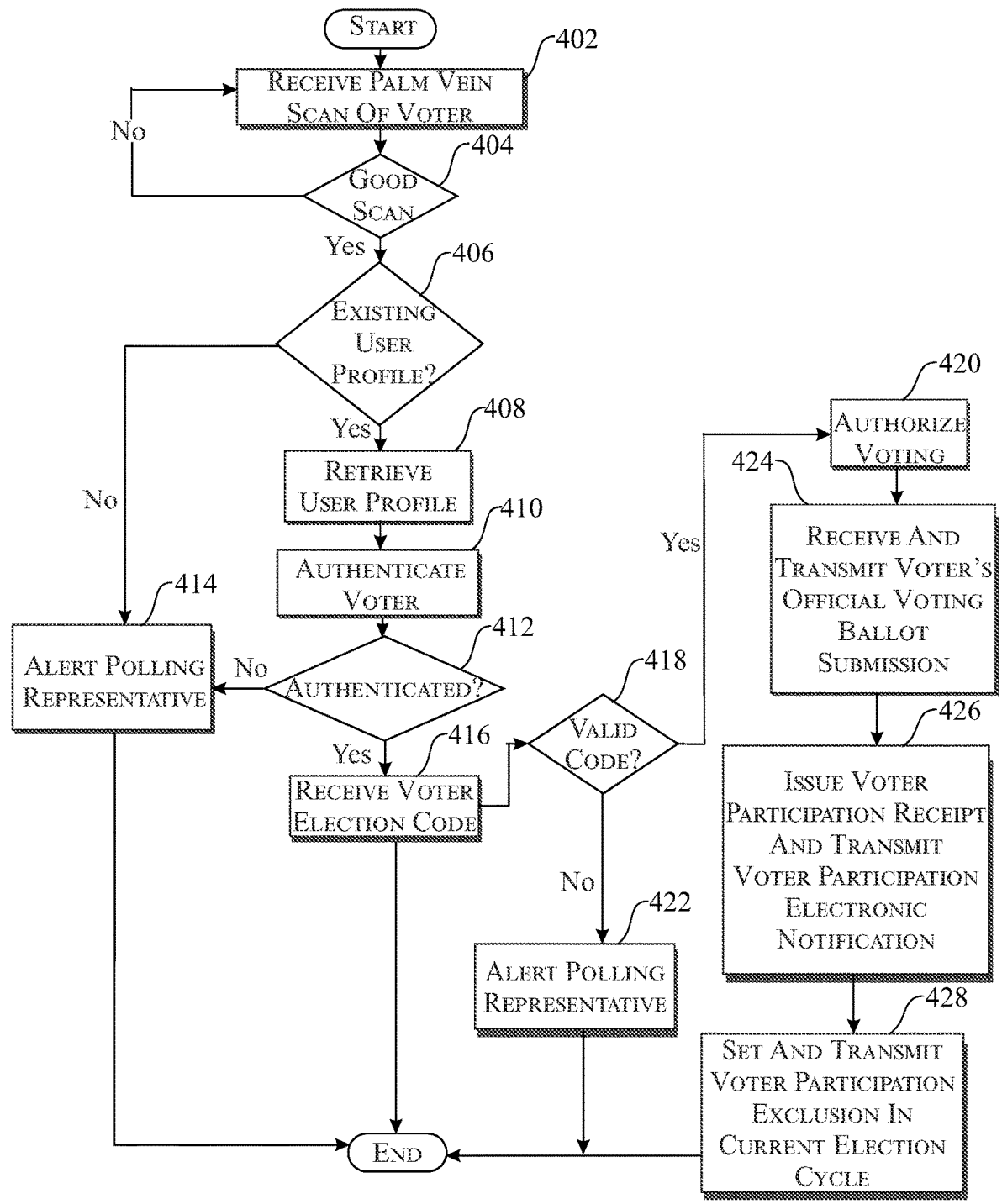

Turning our attention to FIGS. 3 and 4, respectively, flowcharts of illustrative operations for facilitating electronic voting using a three-part voter identity authentication in accordance with an embodiment are shown. Turning our attention first to FIG. 3, illustrative operations 300 are shown for facilitating electronic voting using a three-part voter identity authentication for use with the EVote technology voting kiosk 500 (see, e.g., FIGS. 2 and 5) in accordance with an embodiment. In particular, the operations 300 of FIG. 3 are directed to the registration and initial data collection required from user of the voting kiosk 500, for example. At step 302, a determination is made as to whether the user is a new or existing user. If not a new user, then at step 304 a determination is made if the user is a registered voter. As used herein, "registered voter" means an individual who has legally registered to vote in accordance the applicable jurisdictional requirements. For example, voter registration in the United States is required for voting in federal, state, and local elections. Voter registration typically takes place at the county level in many states and at the municipal level in several states. Most states set cutoff dates for voter registration and to update details, ranging from two (2) to four (4) weeks before an election while others of the states have election day or "same-day" voter registration which enables eligible citizens to register or update their registration when they vote before or on election day. In accordance with the embodiment hereunder, only individuals who are registered voters will be processed by the voting kiosk 500. If not registered, then a determination is made, at step 314, if there is still time for the user to register, and if so, then at step 316, the user is registered to vote in accordance with the applicable local, jurisdictional requirements.

Once registered, then at steps 318, 320, 322, and 324 receive, from a user, a DNA sample, a set of genealogical information, a palm vein scan, and other user profile information, respectively. Importantly, in accordance with the principles of the disclosed embodiments, the identity authentication, carried out by and through the EVote technology voting kiosk 500, employs a specific three-part authentication comprising a DNA sample, a set of genealogical information, and palm vein scan that are each specific to a particular individual. Given their importance to the technical advancement hereunder, the following is a brief discussion of each. As will be appreciated, DNA is found in every cell of a human body and it contains your individual genetic code. A DNA sample is taken either by swabbing the inside of a person's mouth (called a "buccal test"), or by a blood test, usually done by pricking the person's finger. The DNA sample received from the register voter may by any such typical DNA sample. A genealogical DNA test is a DNA-based test which looks at specific locations of a person's genome, in order to find or verify ancestral genealogical relationships or to estimate (with lower reliability) the ethnic mixture of an individual as part of genetic genealogy. Genealogy is the study of families, family history, and the tracing of their lineages. Genealogists use oral interviews, historical records, genetic analysis, and other records to obtain information about a family and to demonstrate kinship and pedigrees of its members. The record of genealogical work may be presented as a "genealogy," a "family history," or a "family tree." In the narrow sense, a "genealogy" or a "family tree" traces the descendants of one person, whereas a "family history" traces the ancestors of one person, but the terms are often used interchangeably. A family history may include additional biographical information, family traditions, and the like.

Three principal types of genealogical DNA tests are available, with each looking at a different part of the genome and being useful for different types of genealogical research: autosomal (atDNA), mitochondrial (mtDNA), and Y-DNA. Autosomal tests may result in a large number of DNA matches to both males and females who have also tested with the same company. Each match will typically show an estimated degree of relatedness, i.e., a close family match, 1st-2nd cousins, 3rd-4th cousins, etc. The furthest degree of relationship is usually the "6th-cousin or further" level. However, due to the random nature of which and how much DNA is inherited by each tested person from their common ancestors, precise relationship conclusions can only be made for close relations. Traditional genealogical research, and the sharing of family trees, is typically required for interpretation of the results. Autosomal tests are also used in estimating ethnic mix. mtDNA and Y-DNA tests are much more objective, however, they give considerably fewer DNA matches, if any (depending on the company doing the testing), since they are limited to relationships along a strict female line and a strict male line, respectively. mtDNA and Y-DNA tests are utilized to identify archeological cultures and migration paths of a person's ancestors along a strict mother's line or a strict father's line. Based on mtDNA and Y-DNA, a person's haplogroup(s) can be identified. The mtDNA test can be taken by both males and females, because everyone inherits their mtDNA from their mother, as the mitochondrial DNA is located in the egg cell. However, a Y-DNA test can only be taken by a male, as only males have a Y-chromosome. Currently available DNA testing kits include AncestryDNA (best for genealogy and ethnicity testing), MyHeritage (best on a budget and for international matches), 23andMe (best for genetic health reports), and FamilyTree (best for British ancestry).

Palm vein recognition technology pairs a biometric scanner with advanced matching software. A biometric palm vein scanner uses a near-infrared light wave to capture the vein pattern in a person's palm. This scan produces a unique biometric template that is a digital representation of the person's unique vein pattern. During the initial enrollment process, the palm vein recognition technology solution associates this unique biometric template with the user's profile hereunder. Palm vein scan is a powerful biometric that uses the internal vein pattern of your palm to identify you. Like fingerprints, each person's palm vein pattern is unique and does not change. However, this unique identification method has several key security and privacy advantages over traditional biometrics (such as fingerprint and facial recognition). Palm vein scan is a biometric that works by using infrared light to map the unique vein structure of your palm, capturing over five (5) million data points. The palm vein scanner then converts these data points into a unique encrypted code that becomes your biometric ID. There is one key feature that makes palm vein recognition stand out from other biometrics. Unlike your fingerprint, iris, or face, your palm vein pattern is internal. Because your palm vein pattern is concealed inside your hand, it is not exposed like other biometrics. This gives it several unique advantages over other biometrics and particularly well-suited for the disclosed embodiments herein. Since palm vein recognition is internal, it not only has significant security advantages, but privacy advantages as well. Biometrics such as facial recognition have a critical flaw, namely, your face is exposed everywhere you go, making it easy for face scanners to identify you from a distance without your consent. Since palm vein is internal to the body, it can only be captured via a close-up, high-definition camera in combination with UV light. So, unless you deliberately scan your hand on the palm vein device, it is exceedingly difficult for it to be captured. This makes palm vein uniquely private and secure. Further, Since the palm has a larger surface area than the finger or iris, for example, the palm vein scanner is able to capture a larger number of data points. This gives it an accuracy advantage compared to other biometrics.

In terms of reliability, each person's palm vein pattern remains relatively stable throughout life, so the chance that a registered user hereunder will have to re-enroll in the future is exceptionally low. Certain other biometrics are more susceptible to change over time. Fingerprints, for example, are vulnerable to wear and damage due to being exposed, and/or cuts and abrasions on the finger may make it possible for an authorized user to be unrecognized by fingerprint scanners and incorrectly denied access. With palm vein, however, the chance of damage to the palm's vein structure is generally lower, making it more stable over time. Additionally, the palm vein scanner itself is resistant to dirt, dust, dryness, and moisture, making it functional in a variety of different environments and particularly ideal for the public voting environment hereunder. Further, as to hygiene aspects, palm vein is contactless, meaning that a person does not have to touch the sensor to scan their palm. To identify oneself, the person simply hovers their hand over the scanner and no touch is required. This makes it much more hygienic than other biometrics that require the person to touch the scanner, such as fingerprint. This is particularly relevant for biometric devices that are shared among a large numbers of people, such as those in voting polling sites.

Turing our attention back to FIG. 3, illustratively, once enrolled, the returning user (i.e., registered voter) simply provides their palm scan via the voting kiosk 500. Then, the voting kiosk 500 retrieves the user's individual user profile automatically and accurately. At step 312, the user profile is stored comprising the received DNA sample, set of genealogical information, palm vein scan, and other user profile information. If at step 304, the user is a confirmed registered voter then, at step 306, a determination is made as to whether this registered voter has an existing user profile. If not, the operations proceed beginning with step 314, as detailed above. If so, then the user profile is retrieved, at step 308, and any updates to the user profile are made at step 310. Thereafter, at step 312, the user profile is stored.

Turning our attention to FIG. 4, operations 400 are shown and which are directed to the operations performed by the voting kiosk 500, for example, upon the voter 202 arriving at the polling site 204, as depicted in FIG. 2. At step 402, receiving, from a palm vein scanner (e.g., the palm vein scanner 522, see FIG. 5), a palm vein scan of a voter, and at step 404 determining whether the receive scan is a "good" scan (i.e., can be effectively used for the authentication operations herein). The aforementioned operations may further comprise scanning, from the palm vein scanner and in real-time, the palm vein scan of the user (this scan being the second such palm vein scan in addition to the first employed during the creation of the user profile). If not, the voter 202 is required to re-scan their palm until such time that a "good" scan is received. Then, at step 406, determining whether the voter 202 has an existing user profile. If not, then altering a polling representative, at step 414, to determine how the voter 202 will cast their votes, if at all. If registered (i.e., an existing user with a respective user profile), retrieving, at step 408, a respective user profile for the registered voter from a plurality of user profiles for the registered user. As noted above, the respective user profile comprising at least a DNA sample, a set of genealogical information and a palm vein scan that is specific to said user. Then, at step 410, authenticating, using the palm vein scan received and the respective user profile retrieved, the identity of the registered voter. If, at step 412, the registered voter's identity is authenticated, at step 416, receiving from the registered voter, using a QR code reader (e.g., the QR code reader 524, see FIG. 5), a voter election code, and at step 418, determining whether the voter election code received is valid. The aforementioned operations may further comprise scanning, from the QR code reader and in real-time, the voter election code. If the voter election code is not valid, then at step 422 alerting a polling representative. If the voter election code is valid, authorizing voting, at step 420, for the registered voter, and receiving and transmitting the registered voter's official ballot submission, at step 424. Then, at step 426, issuing a voter participation receipt to the registered voter and transmitting a voter participation electronic notification. At step 428, setting and transmitting a voter participation exclusion for the current election cycle specific to the registered voter.

In an embodiment, the transmission of the voter's user profile, palm vein scan and/or registered voter's official ballot submission are transmitted using a blockchain which is a type of distributed ledger technology. A blockchain relies on three important components that are private key technology, a distributed network that includes a shared ledger and an accounting, means for the transactions and records across the network. A blockchain is a list of records (called blocks) that are cryptographically linked together such that each block contains a cryptographic hash of the previous block, a timestamp, and transaction data. Thus, a blockchain is highly resistant to date modification due to the design feature that once recorded the data in any given block cannot be altered without alteration of all subsequent blocks. In many applications, the constructed distributed ledger is managed by a peer-to-peer network that allows participants to verify and audit transactions in an efficient manner. By combining the use of cryptographic keys with a distributed network, blockchain expands the type and number of digital transaction possibilities. As such, in accordance with the embodiment, the transmission of at least the voter's user profile, palm vein scan and/or registered voter's official ballot submission using a blockchain further increases the overall security of the operations.

Figure 5:
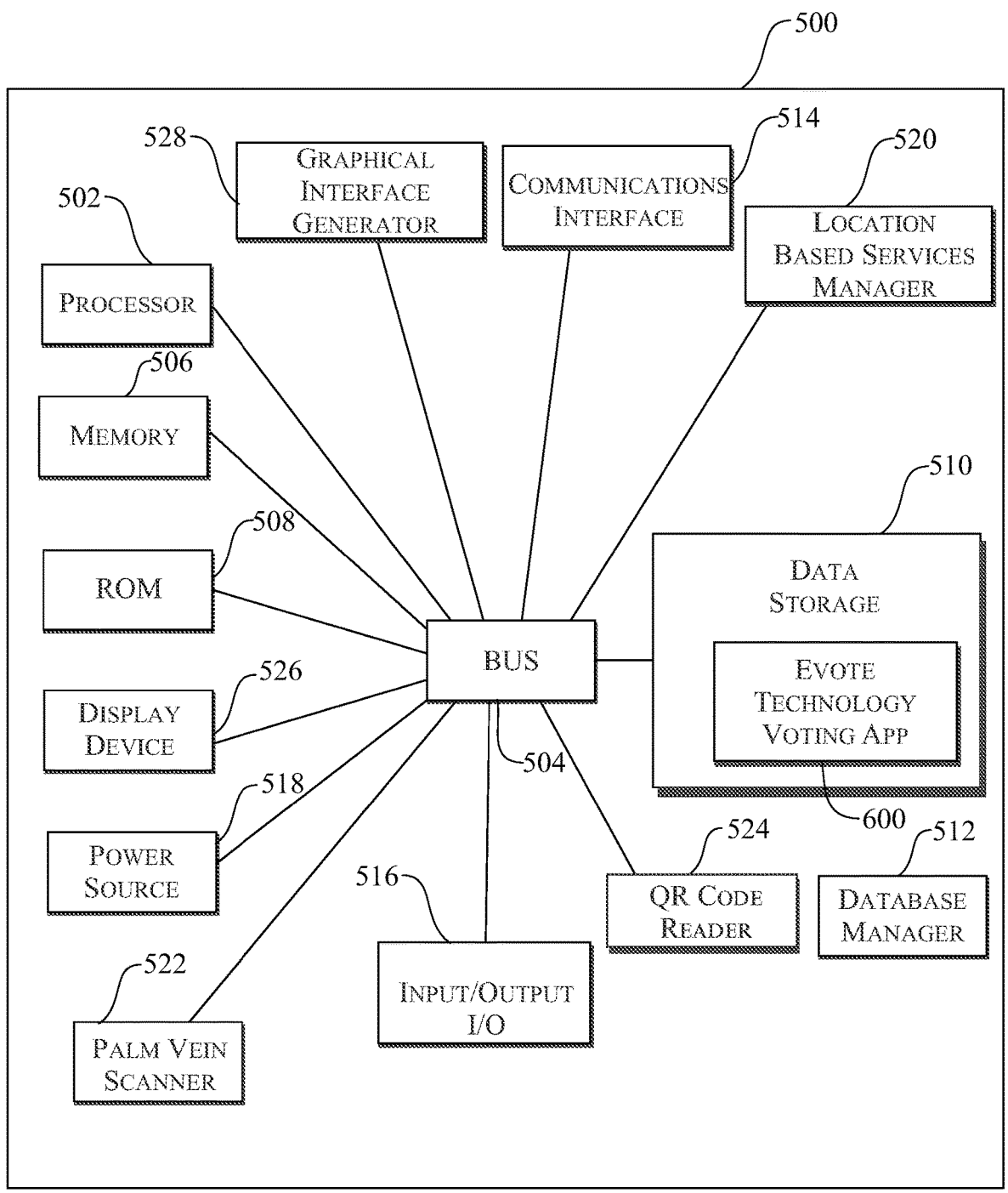
FIG. 5 presents an illustrative architecture for an EVote technology voting kiosk in accordance with an embodiment.

Turning our attention to FIG. 5, an illustrative configuration for the EVote technology voting kiosk 500 in accordance with an embodiment. As shown, the EVote technology voting kiosk 500 comprises processor 502 for executing program code (e.g., the EVote technology voting system app 600) and communications interface 514 for managing communications to and from the EVote technology voting kiosk 500, memory 506 and/or ROM 508 for storing program code and data, and power source 518 for powering the EVote technology voting kiosk 500. The processor 502, as connected to bus 504 and powered by the power source 518, may include both general and special purpose microprocessors, and may be the sole processor or one of multiple processors of the device. This holds true also for any processor referenced hereunder. Further, the processor 502 may comprise one or more central processing units (CPUs) and may include, be supplemented by, or incorporated in, one or more application-specific integrated circuits (ASICs) and/or one or more field programmable gate arrays (FPGAs).

The memory 506 is coupled to the bus 504 for storing computer-readable instructions to be executed by the processor 502 (e.g., execution of the EVote technology voting system app 600). Database manager 512 is used to manage the delivery and storage of content, data, and other information in the EVote technology voting database(s) 210, the election database(s) 206, and/or the voter database(s) 208, as shown in FIG. 2. The EVote technology voting database(s) 210 may store and provide information including, but not limited, to user profiles, DNA sample data, the sets of genealogical data and/or the palm vein scans. As will be discussed in greater detail herein below, the EVote technology voting system app 600, as stored in data storage 510, when executed by the processor 502 will enable access by the voter (e.g., voter 202) to the EVote technology voting kiosk 500 for delivery, execution, management, and optimization of identity authentication and electronic voting hereunder. Data storage device 510 (or any other data storage device hereunder) and the memory 506 may each comprise a tangible non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Location-based services manager 520 facilitates the delivery of location-based services (e.g., GPS tracking) thereby allowing the EVote technology voting kiosk 500 to register the exact location of the voter 202, for example, at the polling site 204. Importantly, the EVote technology voting kiosk 500 provides an advantageous improvement of at least two practical applications, i.e., electronic voting and identity authentication. This solves an electronic voting security problem and reduces the possibility of voter fraud. Importantly, in accordance with the principles of the disclosed embodiments, the identity authentication, carried out by and through the EVote technology voting kiosk 500 hereunder, employs a specific three-part authentication comprising a DNA sample, a set of genealogical information, and palm vein scan that are each specific to a particular individual. This interactive engagement with the registered voter, in accordance with the disclosed embodiments, is facilitated by a customized visualization tool and graphical interface, as facilitated by graphical interface generator 528 and displayed by and through display device 526, for example, that employs palm vein scanner 522 to capture a palm vein scan of the registered voter. Similarly, QR code reader 524 is used to capture the voter identification code(s), as detailed herein above. It will be understood that while the instant embodiment shows the display device 526 integrated within the EVote technology voting kiosk 500 this is not limiting in nature and the display device 526 and/or the palm vein scanner 522 and/or QR code reader 524 may be independent of and external to the EVote technology voting kiosk 500 in accordance with principles of the disclosed embodiments herein.

The communications interface 514 is used to facilitate communications across the communications links 816 (see, FIG. 8) within cloud 802 (see, FIG. 8) in a well understand fashion. This may take the form, for example, of a wide area network connection that communicatively couples the EVote technology voting system 700 (see, FIG. 8) with access points 806 (see, FIG. 8) which may be a cellular communications service. Similarly, communications managed by the communications interface 514 may take the form, for example, of a local Wi-Fi network interface or Ethernet interface the communicatively couples the EVote technology voting system 700 with Internet 814 (see, FIG. 8) and/or a local area network (LAN) and ultimately with the EVote technology voting kiosk 500. In the instant embodiment, the EVote technology voting system app 600 and/or the communications interface 514 may include a communications stack for facilitating communications over the respective communications link 816. Electronic communications by and through EVote technology voting kiosk 500 between the various systems, networks, devices, users, entities, and/or individuals are facilitated by the communications links 816 in accordance with any number of well-known communications protocols and methods (e.g., wireless communications).

The communications interface 514 may also be used for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 514 (or any other such communications interface referenced hereunder) may be an integrated services digital network (ISDN) card or modem/router used to facilitate data communications of various well-known types and formats. Further, illustratively, the communications interface 514 may be a local area network (LAN) card used to provide data communication connectivity to a comparable LAN. Wireless communication links may also be implemented. As will be appreciated, the functionality of the communications interface may also be to send and receive a variety of signals (e.g., electrical, optical, or other signals) that transmit data streams representing various data types. The EVote technology voting kiosk 500 may also include one or more input/output devices 516 that enable user interaction with other hardware devices (e.g., camera, display, keyboard, mouse, speakers, microphone, buttons, etc.). The input/output devices 516 (or any other I/O devices referenced hereunder) may include peripherals, such as a camera, printer, scanner, display screen, etc. For example, the input/output devices 516 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the EVote technology voting kiosk 500 or an associated display device, for example.

Figure 6:
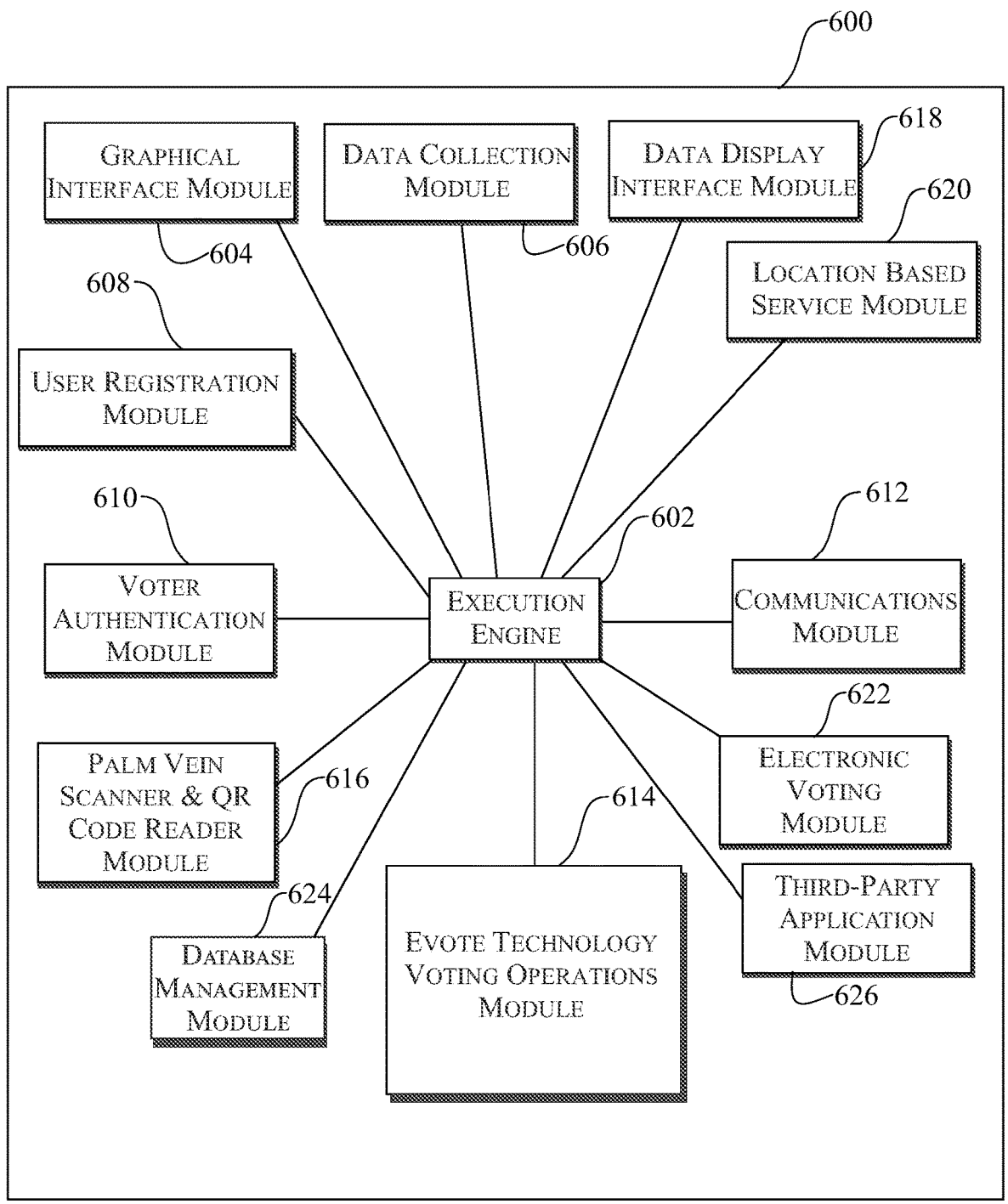
FIG. 6 presents an illustrative architecture for an EVote technology voting app in accordance with an embodiment.

Turning our attention to FIG. 6, an illustrative architecture for an EVote technology voting app 600 is shown in accordance with an embodiment. As will be appreciated, the architecture may be used in conjunction with the EVote technology voting kiosk 500 and/or the EVote technology voting system 700 for launching and executing the EVote technology voting system app 600 and its associated operations. As shown, the architecture for the operation of the EVote technology voting system app 600 provides several interfaces and engines used to perform a variety of functions such as the collection, aggregation, manipulation, processing, analyzing and display of applicable real-time information and data that are useful to achieve the voter identity authentication and other electronic voting services of the disclosed embodiments. As detailed herein, while FIG. 6 describes an embodiment of the EVote technology voting system app 600 for execution, illustratively, on the EVote technology voting kiosk 500 it will also be understood that other hardware devices may be used to execute and operate the EVote technology voting system app 600 in any real-time setting including but not limited to the EVote technology voting system 700. For example, a network-enabled portable tablet computer and/or dedicated portable hardware device may be employed equally in the context of the disclosed embodiments. The software application may be written in a code language such as, but not limited to, Java, C programming and the like and compatible with Linux, Windows, Android, and Apple operating system platforms.

Data display interface module 618 and communications module 612 are used to facilitate the input/output and display of electronic data and other information (e.g., a graphical user interface) to, illustratively, the users (e.g., the voter 202) employing the EVote technology voting kiosk 500 (e.g., a touch screen of the EVote technology voting kiosk 500) and executing the EVote technology voting system app 600. The data collection module 606 facilitates the collection of user/registered voter information from the plurality of voters at a particular polling site (e.g., the polling site 204) and/or other third parties (e.g., polling representatives). The data display interface module 618 facilitates the delivery of the graphical interface that enables the voter identity authentication and other voting services, as detailed herein. The location-based services module 620 provides for the delivery of location-based services in order for the geographic locations of the consumers to be identified and displayed (e.g., GPS locations). The communications module 612 will facilitate communications by and through the EVote technology voting kiosk 500, for example. The user registration module 608 coordinates the registration of new users (i.e., registered voters) and the collection of their respective user profile including but not limited to the requisite DNA sample, set of genealogical information and the initial palm vein scan from the new user at the time of such registration.

Execution engine 602 may be employed to deliver the voter identity authentication and other voting services herein through the execution of the EVote technology voting system app 600. In such delivery, the execution engine 602 will operate and execute, as further detailed herein below, with at least the following program modules: graphical interface module 604, data collection module 606, data display module 618, location-based services module 620, user registration module 608, voter authentication module 610, communications module 612, EVote technology voter operations module 614, palm vein scanner & QR code reader module 616, electronic voting module 622, and database management module 624. Further, in embodiments directed to third-party applications the third-party application module 626 will be further called upon in the operational execution. More particularly, the graphical interface module 604, the data collection module 606, the data display interface module 618, the voter authentication module 610, the palm vein scanner & QR code reader module 624, the communications module 612, the EVote technology voting operations module 614, the electronic voting module 622 and the third-party application module 626 will provide for operations that when executed will deliver features of generating a graphical interface for display on a display device that facilitates and enables the voter identity authentication and other electronic voting services of the disclosed embodiments. As detailed herein, the voter identity authentication and other voting services delivered herein, as managed by the EVote technology voting operations module 614, utilize a graphical interface for receiving the palm vein scan from a registered voter by and through the palm vein scanner 522 as managed by the palm vein scanner & QR code reader module 616. Similarly, as managed by the palm vein scanner & QR code reader module 616, the QR code reader 524 is employed to receive the voter election code from the registered employing the EVote technology voting kiosk 500 at the polling site 204, for example. Illustratively, this voter election code is specific to such registered voter and as issued by the election office/regulatory body associated such registered voter (e.g., the federal level regulatory body 102 and/or the state level regulatory body 104). The information represented by and embedded in the voter election code is specific to and pertains only to the actual voting event or cycle and does not include any information with respect to the identity of any individual person.

Figure 7:
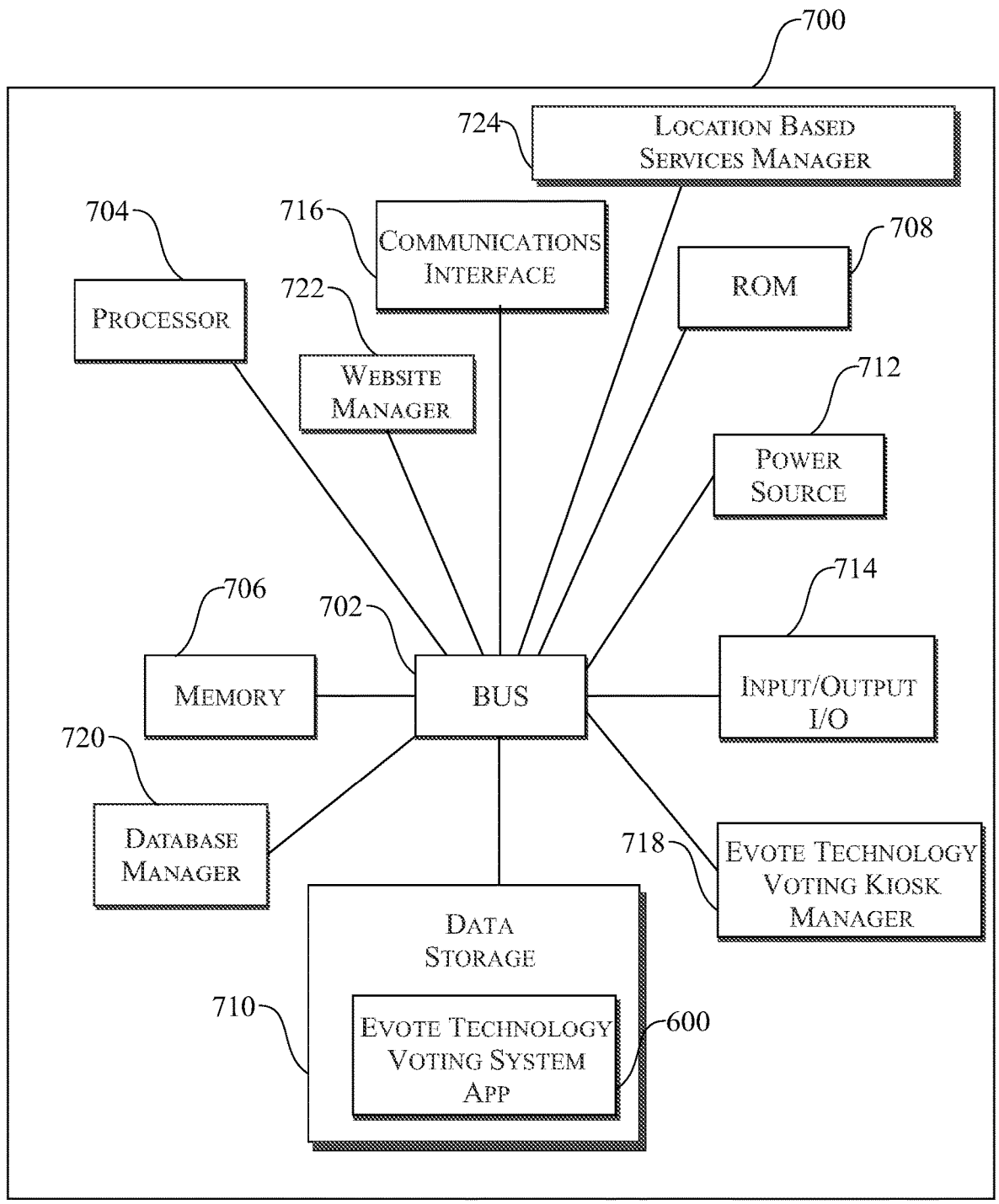
FIG. 7 presents an illustrative architecture for an EVote technology voting system in accordance with an embodiment.

Turning our attention to FIG. 7, an illustrative architecture for the EVote technology voting system 700 is shown in accordance with an embodiment. As shown, the EVote technology voting system 700 comprises processor 704 for executing program code (e.g., the EVote technology voting app 600) and communications interface 716 for managing communications to and from the EVote technology voting system 700, memory 706 and/or ROM 708 for storing program code and data, and power source 712 for powering the EVote technology voting system 700. The memory 706 is coupled to the bus 702 for storing computer-readable instructions to be executed by the processor 704 (e.g., execution of the EVote technology voting app 600). Database manager 720 is used to manage the delivery and storage of content, data, and other information in the EVote technology voting database(s) 210, the election database(s) 206, the voter database(s) 208 and/or across third party content providers, for example. As noted previously, the EVote technology voting database(s) 210 may store and provide information including, but not limited, to user IDs, DNA samples, sets of genealogical information and palm vein scans. Similarly, website manager 722 is used to deliver and manage content, data, and other information across one or more websites that may be utilized to access and use the EVote technology voting system 700, for example. Illustratively, the user identity authentication and other voting services provided through the execution of the EVote technology voting app 600 may also include accessing and interfacing any number of web pages (e.g., as constructed and hosted by the third-party content providers) with a variety of third-party websites using website manager 722 for procuring information and data that can be used in the EVote technology voting system 700. The term "website" in the context herein is used in a conventional and broadest sense and is located on at least one server containing web pages stored thereon and is operational in a 24-hour/7-day typical fashion.

As previously detailed, the EVote technology voting system app 600, as stored in data storage 710, when executed by the processor 704 will enable access by the voter (e.g., the voter 202) to the EVote technology voting system 700 by and through the EVote technology kiosk 500 located at the particular polling site (e.g., the polling site 204). Management of the plurality of voting kiosks 500 that may be located throughout a particular region (or country) is facilitated by EVote technology voting kiosk manager 718 for delivery, execution, management, and optimization of the user identity authentication and other electronic voting services. Location-based service manager 724 facilitates the delivery of location-based services (e.g., GPS tracking) thereby allowing the EVote technology voting system 700 to register the exact location of the user/registered voter at any particular time (e.g., at the polling site 204).

The communications interface 716 is used to facilitate communications across the communications links 816 (see, FIG. 8) within a cloud network (see, the cloud 802 in FIG. 8) in a well understand fashion. This may take the form, for example, of a wide area network connection that communicatively couples the EVote technology voting system 700 with access points 806 (see, FIG. 8) which may be a cellular communications service. Similarly, communications managed by the communications interface 716 may take the form, for example, of a local Wi-Fi network interface or Ethernet interface the communicatively couples the EVote technology voting system 700 with the Internet 814 (see, FIG. 8), a local area network (LAN) and ultimately the EVote technology voting kiosk 500.

As will be appreciated, the functionality of the communication interface 716 is to send and receive a variety of signals (e.g., electrical, optical, or other signals) that transmit data streams representing various data types. The EVote technology voting system 700 may also include one or more input/output devices 714 that enable user interaction with the EVote technology voting system 700 (e.g., camera, display, keyboard, mouse, speakers, microphone, buttons, etc.). The input/output devices 714 may include peripherals, such as a camera, printer, scanner, display screen, etc. For example, the input/output devices 714 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the EVote technology voting system 700 or an associated display device, for example.

Figure 8:
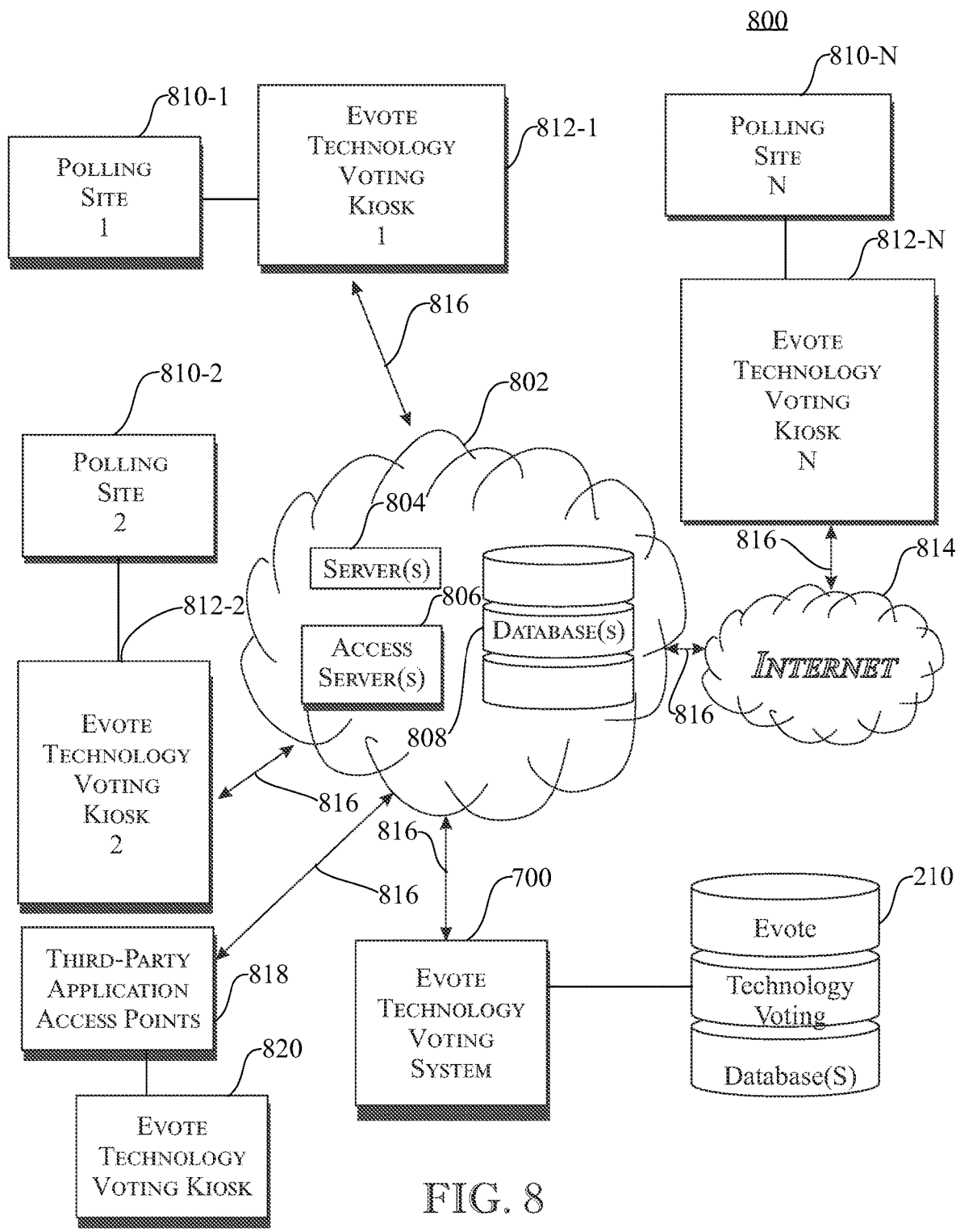
FIG. 8 presents a high-level block diagram of a cloud network services architecture for use with the EVote technology voting kiosk of FIG. 5 and the EVote technology voting system of FIG. 7 in accordance with an embodiment.

FIG. 8 presents a high-level block diagram of a cloud network services architecture 800 for use the EVote technology voting kiosk 500 and/or the EVote technology voting system 700 in accordance with an embodiment. As shown for instance in FIG. 8, the cloud network services architecture 800 includes the cloud 802 comprising at least server(s) 804, access point(s) 806 and database(s) 808. The cloud 802 facilitates the delivery of the electronic voting authentication operations executed by and through EVote technology voting kiosk 1 812-1, EVote technology voting kiosk 1 812-2 through EVote technology voting kiosk N 812-N (each such voting kiosk configured in accordance with FIG. 5) located at polling site 1 810-1, polling site 2 810-2 through polling site N 810-N, respectively. Further, identity fraud detection with respect to the use of and access to any third-party application using the aforementioned three-part voter identity authentication, as further detailed hereinbelow, is also enabled by employing, illustratively, EVote technology voting kiosk 820 (also configured in accordance with FIG. 5) at one or more third-party application access points 818 (e.g., an office building, an airport, a school and/or a governmental building, to name just a few).

As noted above, the cloud 802 comprises at least server(s) 804, the access point(s) 806 and the database(s) 808. Cloud, cloud service, cloud server and cloud database are broad terms and are to be given their ordinary and customary meaning to one of ordinary skill in the art and includes, without limitation, any database, data repository or storage media which store content typically associated with and managed by users, regulatory bodies, election bodies, and third-party content providers, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces. The cloud server may be implemented in one or more servers and may send and receive content in a various forms and formats, user supplied and/or created information/content and profile/configuration data that may be transferred to, read from or stored in a cloud database (e.g., the databases 808). The cloud 802 may also facilitate the use by third-party content providers, regulatory bodies, election bodies, and other third parties in the course of the electronic execution services provided using the EVote technology voting kiosk 812-1, for example.

A cloud database may include one or more physical servers, databases or storage devices as dictated by the cloud service's storage requirements. The cloud database may further include one or more well-known databases (e.g., an SQL database) or a fixed content storage system to store content, profile information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools. In this way, in accordance with various embodiments, the users may control, initiate, and engage in the electronic voting services herein in a fully transparent fashion without any required understanding of the underlying hardware and software necessary to interface, communicate, manipulate, and exchange information and/or data necessary to deliver such services.

Figure 9:
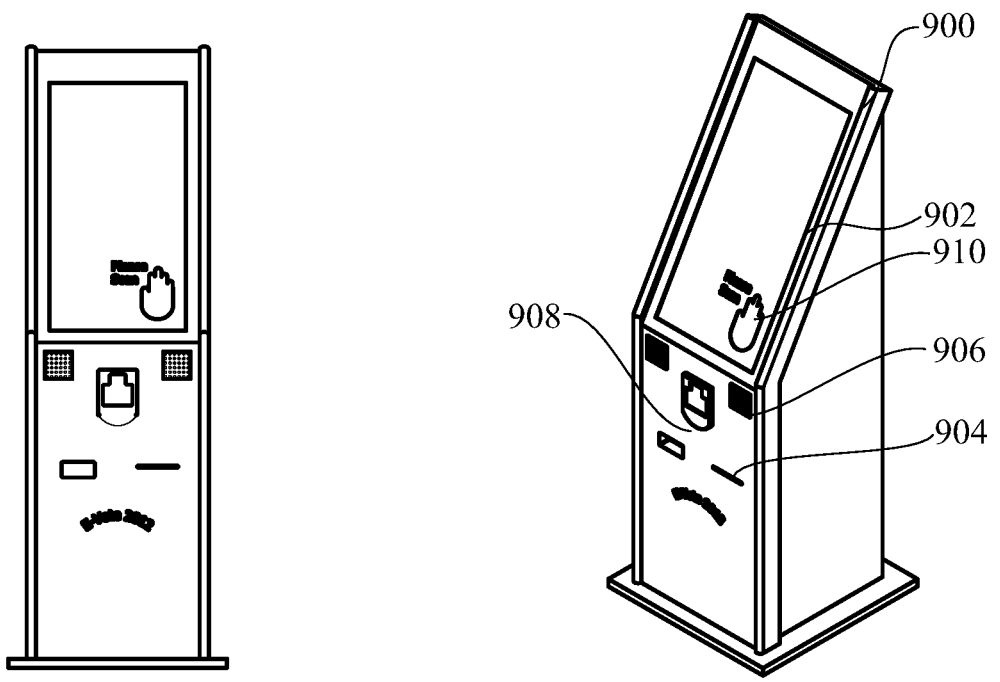
FIG. 9 presents an illustrative voter kiosk configured in accordance with an embodiment.

FIG. 9 presents an illustrative voter kiosk 900 configured in accordance with an embodiment. The configuration of the voter kiosk 900 is in accordance with the voting kiosk 500 architecture shown in FIG. 5, as discussed previously. As shown in FIG. 9., the voter kiosk 900 comprises display interface 902 that has the palm vein scanner 910 embedded therein such that the user approaches the voter kiosk 900 and scans their palm, as detailed herein above. The palm vein scanner 910 may be the PalmSecure® palm vein scanner as commercially available from Fujitsu. Speakers 906 allows for audible commands and other sounds to be broadcast to the user. QR code reader 908 (e.g., the commercially available QuickMark QR code reader) is configured for the scanning, by the user, of their voter identification code at the appropriate time, and slot 904 allows for the distribution of the voter participation receipt, as detailed herein above, confirming the voter's ballot submission and participation in the current election cycle.

Figure 10:
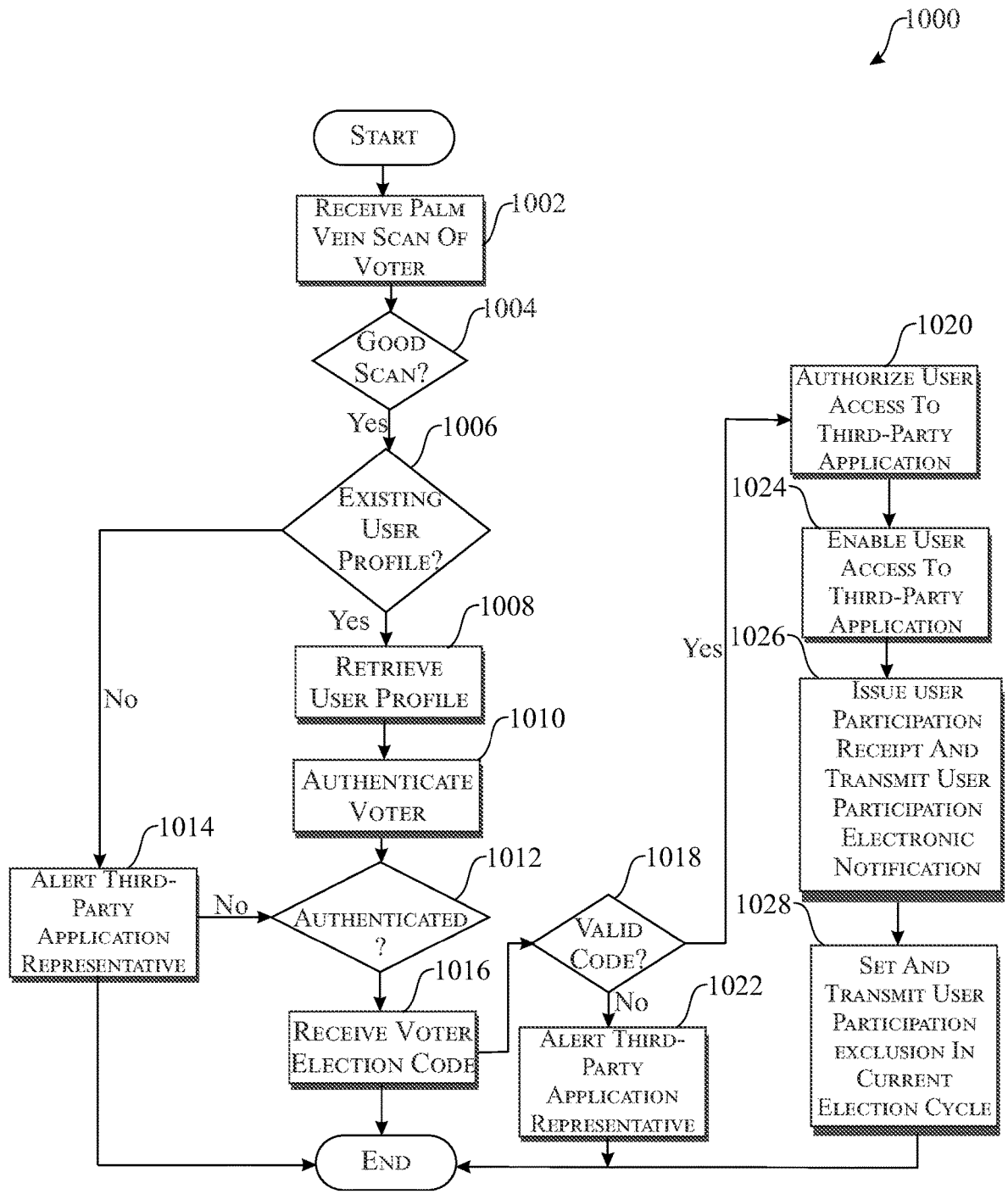
FIG. 10 present a flowchart of illustrative operations for using three-part voter identity authentication in facilitating and enhancing the reduction of identity fraud associated with the use of and access to any third-party applications in accordance with an embodiment.

Turning our attention to FIG. 10, a flowchart of illustrative operations 1000 is shown for using three-part voter identity authentication in facilitating and enhancing the reduction of identity fraud associated with the use of and access to any third-party applications in accordance with an embodiment. More particularly, for example, the voter 202 (i.e., in the subject embodiment the intended user of the third-party application) arrives at the third-party application access point 212, as depicted in FIG. 2. In this way, access to and use of the third-party application (as illustratively available at the third-party application access point 212) will be governed by using three-part voter identity authentication in accordance with the disclosed embodiments. Thus, the advantageous identity verification and fraud principles detailed herein may be used to deliver identity fraud detection and protection to any third-party application in which authenticating and verify a user's identity is critical. In accordance with the subject embodiment such third-party applications include, but are not limited to, a verification of individual participation (VIP), an international transportation and travel services (ITAS), an employment eligibility U.S. Citizenship and Immigration Services (USCIS), Form I-9 services (I-Verify), an electronic verification of transactions (EVT), a school attendance verification and eats (SAVE), a family united network (FUN), a children abduction recovery education system (CARES), a food assistance programs (FAP), a census counting protocol (CCP), and a vaccination and authentication status system (VASS).

Then, at step 1002, receiving, from a palm vein scanner (e.g., the palm vein scanner 522, see FIG. 5), a palm vein scan of a voter, and at step 1004 determining whether the receive scan is a "good" scan (i.e., can be effectively used for the authentication operations herein). The aforementioned operations may further comprise scanning, from the palm vein scanner and in real-time, the palm vein scan of the user (this scan being the second such palm vein scan in addition to the first employed during the creation of the user profile). If not, the voter 202 is required to re-scan their palm until such time that a "good" scan is received. Then, at step 1006, determining whether the voter 202 has an existing user profile. If not, then altering a third-party application representative (e.g., an administrator for the third-party application), at step 1014, to determine whether the voter 202 (i.e., potential user of the third-party application) will be granted access to the third-party application, if at all. If registered (i.e., an existing user with a respective user profile), retrieving, at step 1008, a respective user profile for the registered voter from a plurality of user profiles for the registered user. In the subject embodiment, the respective user profile may be further supplemented with any information germane to any third-party application the user has qualified access to. As noted above, the respective user profile comprising at least a DNA sample, a set of genealogical information and a palm vein scan that is specific to said user. Then, at step 1010, authenticating, using the palm vein scan received and the respective user profile retrieved, the identity of the registered voter. If, at step 1012, the registered voter's identity is authenticated, at step 1016, receiving from the registered voter, using a QR code reader (e.g., the QR code reader 524, see FIG. 5), a voter election code, and at step 1018, determining whether the voter election code received is valid. The aforementioned operations may further comprise scanning, from the QR code reader and in real-time, the voter election code. In the subject embodiment, the valid voter election code maintains an important role in the authentication procedures as directed to identity authentication for the third-party application. In essence, the voter election code serves a dual purpose. If the voter election code is not valid, then at step 1022 alerting the third-party application representative. If the voter election code is valid, authorizing, at step 1020, access to the third-party application upon a request from the registered voter for access thereto, and enabling user access to the third-party application at step 1024. The access request may come in any number of forms including, but not limited, electronic forms and physical forms. Illustratively, in an embodiment, receiving the request from the registered voter via a kiosk configured for receiving the same (e.g., the EVote technology voting kiosk 820). Further, in an embodiment, a third-party application access grant notification may be transmitted to the registered voter. Illustratively, in an embodiment, transmitting a third-party application access grant notification to the registered voter. Then, at step 1026, issuing a third-party application participation receipt to the registered voter and transmitting a third-party application participation electronic notification. At step 1028, on an optional basis, setting and transmitting a third-party participation exclusion for the current election cycle specific to the registered voter but only to the extent such third-party application has any such one-time use limitation. Otherwise, no such participation exclusion transmission is necessary or appropriate. In this way, it will be understood that the principles of the disclosed embodiments apply equally to any third-party application in which there is a need for robust identity authentication for any reason including, but not limited, reducing fraud.

As noted above, in some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIGS. 3-4 and 10) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A user identity authentication method for accessing a third-party application, the method comprising:
    receiving, from a user, a DNA sample, a set of genealogical information and a first palm vein scan;
    creating a user profile, the user profile comprising at least the DNA sample, the set of genealogical information and the first palm vein scan received;
    storing, in a database, the user profile created;
    receiving, from a palm vein scanner, a second palm vein scan of the user;
    determining whether the user is a registered voter;
    if registered, retrieving the user profile stored for the registered voter from a plurality of user profiles in the database, the user profile retrieved comprising at least the DNA sample, the set of genealogical information and the first palm vein scan;
    authenticating, using the second palm vein scan received and the user profile retrieved, the registered voter's identity;
    if the registered voter's identity is authenticated, receiving from the registered voter; using a QR code reader, a voter election code;
    determining whether the voter election code received is valid;
    if valid, authorizing access for the registered voter to the third-party application upon a request from the registered voter for access thereto; and
    enabling the registered voter's access to the third-party application.

2. The user identity authentication method of claim 1, wherein the method further comprises:
    transmitting a third-party application access grant notification to the registered voter.

3. The user identity authentication method of claim 1, wherein the method further comprises:
    issuing a third-party application participation receipt to the registered voter.

4. The user identity authentication method of claim 1, wherein the method further comprises:
    transmitting, to an administrator for the third-party application, a voter participation electronic notification signifying that the registered voter has access to the third-party application.

5. The user identity authentication method of claim 1, wherein the method further comprises:
    setting a third-party application participation exclusion for a current election cycle specific to the registered voter and to the third-party application.

6. The user identity authentication method of claim 5, wherein the method further comprises:
    transmitting, to an administrator for the third-party application, the voter participation exclusion for the current election cycle specific to the registered voter.

7. The user identity authentication method of claim 1, wherein the palm vein scanner and the QR code reader are integrated with a voting kiosk.

8. The user identity authentication method of claim 7, wherein the method further comprises:
    scanning, from the palm vein scanner and in real-time, the second palm vein scan of the user.

9. The user identity authentication method of claim 8, wherein the method further comprises:
    scanning; from the QR code reader and in real-time, the voter election code.

10. The user identity authentication method of claim 7, wherein the voting kiosk is part of a third-party application access point.

11. The user identity authentication method of claim 1, wherein the DNA sample, the set of genealogical information and the first palm vein scan received are provided as input by the user during a registration process.

12. The user identity authentication method of claim 1, wherein the voter election code is void of any information identifying the registered voter.

13. The user identity authentication method of claim 1, wherein the method further comprises:
   transmitting a notification that the user is not a registered voter.

14. The user identity authentication method of claim 1, wherein the third-party application is one of: a verification of individual participation (VIP), an international transportation and travel services (ITAS), an employment eligibility U.S. Citizenship and Immigration Services (USCIS), Form I-9 services (I-Verify), an electronic verification of transactions (EVT), a school attendance verification and eats (SAVE), a family united network (FUN), a children abduction recovery education system (CARES), a food assistance programs (FAP), a census counting protocol (CCP), and a vaccination and authentication status system (VASS).

15. The user authentication method of claim 1, wherein the method further comprises:
   receiving, from a kiosk; the request for the third-party application access from the registered voter.

16. A user identity authentication method for accessing a third-party application, the method comprising:
   receiving, from a user, a DNA sample; a set of genealogical information and a first palm vein scan;
   creating a user profile, the user profile comprising at least the DNA sample, the set of genealogical information and the first palm vein scan received;
   storing, in a database, the user profile created;
   receiving a request from the user for access to the third-party application;
   receiving, from a palm vein scanner, a second palm vein scan of the user;
   determining whether the user is a registered voter;
   if registered, retrieving the user profile stored for the registered voter from a plurality of user profiles in the database, the user profile retrieved comprising at least the DNA sample, the set of genealogical information and the first palm vein scan;
   authenticating, using the second palm vein scan received and the user profile retrieved, the registered voter's identity;
   if the registered voter's identity is authenticated, receiving from the registered voter, using a QR code reader, a voter election code;
   determining whether the voter election code received is valid;
   if valid, authorizing access for the registered voter to the third-party application pursuant to the request received;
   enabling the registered voter's access to the third-party application;
   issuing a third-party application participation receipt to the registered voter; and
   transmitting, to an administrator for the third-party application, a voter participation electronic notification signifying that the registered voter has accessed the third-party application.

17. The user identity authentication method of claim 16, wherein the method further comprises:
   scanning, from the palm vein scanner and in real-time, the second palm vein scan of the user.

18. The user identity authentication method of claim 16, wherein the method further comprises:
   scanning, from the OR code reader and in real-time, the voter election code.

19. The user identity authentication method of claim 16, wherein the third-party application is one of: a verification of individual participation (VIP), an international transportation and travel services (ITAS), an employment eligibility U.S. Citizenship and Immigration Services (USCIS), Form I-9 services (I-Verify), an electronic verification of transactions (EVT), a school attendance verification and eats (SAVE), a family united network (FUN), a children abduction recovery education system (CARES), a food assistance programs (FAP), a census counting protocol (CCP), and a vaccination and authentication status system (VASS).

20. A user identity authentication method for accessing a third-party application, the method comprising:
   receiving, from a user, a DNA sample, a set of genealogical information and a first palm vein scan, wherein the DNA sample, the set of genealogical information and the first palm vein scan received are provided as input by the user during a registration process;
   creating a user profile, the user profile comprising at least the DNA sample, the set of genealogical information and the first palm vein scan received;
   storing, in a database, the user profile created;
   receiving a request from the user for access to the third-party application, wherein the third-party application is one of: a verification of individual participation (VIP), an international transportation and travel services (ITAS), an employment eligibility U.S. Citizenship and Immigration Services (USCIS), Form I-9 services (I-Verify), an electronic verification of transactions (EVT), a school attendance verification and eats (SAVE), a family united network (FUN), a children abduction recovery education system (CARES), a food assistance programs (FAP), a census counting protocol (CCP), and a vaccination and authentication status system (VASS);
   scanning, from a palm vein scanner and in real-time, the second palm vein scan of the user;
   receiving, from the palm vein scanner, the second palm vein scanned of the user;
   determining whether the user is a registered voter;
   if registered, retrieving the user profile stored for the registered voter from a plurality of user profiles in the database, the user profile retrieved comprising at least the DNA sample, the set of genealogical information and the first palm vein scan;
   authenticating, using the second palm vein scan received and the user profile retrieved, the registered voter's identity;
   if the registered voter's identity is authenticated, scanning, from a QR code reader and in real-time, a voter election code from the registered voter;
   receiving, from the QR code reader, the voter election code scanned;
   determining whether the voter election code received is valid;
   if valid, authorizing access for the registered voter to the third-party application pursuant to the request received;
   enabling the registered voter's access to the third-party application;
   issuing a third-party application participation receipt to the registered voter; and transmitting, to an administrator for the third-party application, a voter participation electronic notification signifying that the registered voter has access to the third-party application.

* * * * *